(12) United States Patent
Sun et al.

(10) Patent No.: US 11,080,540 B2
(45) Date of Patent: Aug. 3, 2021

(54) 3D VISION PROCESSING USING AN IP BLOCK

(71) Applicant: VanGogh Imaging, Inc., McLean, VA (US)

(72) Inventors: Chao Sun, McLean, VA (US); Xin Hou, McLean, VA (US); Ken Lee, Fairfax, VA (US)

(73) Assignee: VanGogh Imaging, Inc., McLean, VA (US)

( * ) Notice: Subject to any disclaimer, the term of this patent is extended or adjusted under 35 U.S.C. 154(b) by 1 day.

(21) Appl. No.: 16/359,750

(22) Filed: Mar. 20, 2019

(65) Prior Publication Data

US 2019/0294903 A1 Sep. 26, 2019

Related U.S. Application Data

(60) Provisional application No. 62/645,752, filed on Mar. 20, 2018.

(51) Int. Cl.
*G06K 9/00* (2006.01)
*G06T 7/70* (2017.01)
(Continued)

(52) U.S. Cl.
CPC ....... *G06K 9/00986* (2013.01); *G06K 9/4671* (2013.01); *G06T 3/40* (2013.01);
(Continued)

(58) Field of Classification Search
CPC .................................................. G06K 9/00986
See application file for complete search history.

(56) References Cited

U.S. PATENT DOCUMENTS 6,259,815 B1 7/2001 Anderson et al.
6,275,235 B1 8/2001 Morgan, III
(Continued)

FOREIGN PATENT DOCUMENTS

EP 1308902 A2 5/2003
KR 10-1054736 B1 8/2011
(Continued)

OTHER PUBLICATIONS

Rossignac, J. et al., "3D Compression Made Simple: Edgebreaker on a Corner-Table," Invited lecture at the Shape Modeling International Conference, Genoa, Italy (Jan. 30, 2001), pp. 1-6.
(Continued)

*Primary Examiner* — Oneal R Mistry
(74) *Attorney, Agent, or Firm* — Proskauer Rose LLP

(57) ABSTRACT

Described are methods, systems, and apparatuses for 3D vision processing using an IP block. A vision processing module comprises an integrated circuit that performs one or more 3D vision processing algorithms and a plurality of controllers that couple the integrated circuit to each of: a sensor device, a processor, a memory module, and a network interface. The vision processing module receives image data from the sensor device, the image data corresponding to one or more images captured by the sensor device. The vision processing module executes one or more of the 3D vision processing algorithms using at least a portion of the image data as input. The vision processing module transmits an output from execution of one or more of the 3D vision processing algorithms to at least one of: the processor, the memory module, or the network interface.

13 Claims, 12 Drawing Sheets

(51) Int. Cl.
  *G06T 7/50* (2017.01)
  *G06T 7/90* (2017.01)
  *G06K 9/46* (2006.01)
  *G06T 3/40* (2006.01)
  *G06T 3/60* (2006.01)
  *G06T 5/00* (2006.01)

(52) U.S. Cl.
  CPC .............. *G06T 3/60* (2013.01); *G06T 5/002* (2013.01); *G06T 7/50* (2017.01); *G06T 7/70* (2017.01); *G06T 7/90* (2017.01); *G06T 2207/10012* (2013.01); *G06T 2207/20016* (2013.01); *G06T 2207/20164* (2013.01)

(56) References Cited

U.S. PATENT DOCUMENTS

| | | | |
|---|---|---|---|
| 6,525,722 | B1 | 2/2003 | Deering |
| 6,525,725 | B1 | 2/2003 | Deering |
| 7,248,257 | B2 | 7/2007 | Elber |
| 7,420,555 | B1 | 9/2008 | Lee |
| 7,657,081 | B2 | 2/2010 | Blais et al. |
| 8,542,233 | B2 | 9/2013 | Brown |
| 8,766,979 | B2 | 7/2014 | Lee et al. |
| 8,995,756 | B2 | 3/2015 | Lee et al. |
| 9,041,711 | B1 | 5/2015 | Hsu |
| 9,171,402 | B1 | 10/2015 | Allen et al. |
| 9,438,879 | B2 * | 9/2016 | Newton ............... H04N 13/361 |
| 9,607,388 | B2 | 5/2017 | Lin et al. |
| 9,710,960 | B2 | 7/2017 | Hou |
| 2005/0068317 | A1 | 3/2005 | Amakai |
| 2005/0253924 | A1 | 11/2005 | Mashitani |
| 2006/0050952 | A1 | 3/2006 | Blais et al. |
| 2006/0170695 | A1 | 8/2006 | Zhou et al. |
| 2007/0075997 | A1 | 4/2007 | Rohaly et al. |
| 2008/0180448 | A1 | 7/2008 | Anguelov et al. |
| 2010/0209013 | A1 | 8/2010 | Minear et al. |
| 2010/0302247 | A1 | 12/2010 | Perez et al. |
| 2011/0052043 | A1 | 3/2011 | Hyung et al. |
| 2011/0074929 | A1 | 3/2011 | Hebert et al. |
| 2012/0056800 | A1 | 3/2012 | Williams et al. |
| 2012/0063672 | A1 | 3/2012 | Gordon et al. |
| 2012/0098937 | A1 | 4/2012 | Sajadi et al. |
| 2012/0130762 | A1 | 5/2012 | Gale et al. |
| 2012/0194516 | A1 | 8/2012 | Newcombe et al. |
| 2012/0306876 | A1 | 12/2012 | Shotton et al. |
| 2013/0069940 | A1 | 3/2013 | Sun et al. |
| 2013/0123801 | A1 | 5/2013 | Umasuthan et al. |
| 2013/0156262 | A1 | 6/2013 | Taguchi et al. |
| 2013/0208955 | A1 | 8/2013 | Zhao et al. |
| 2014/0160115 | A1 | 6/2014 | Keitler et al. |
| 2014/0176677 | A1 | 6/2014 | Valkenburg et al. |
| 2014/0206443 | A1 | 7/2014 | Sharp et al. |
| 2014/0241617 | A1 | 8/2014 | Shotton et al. |
| 2014/0321702 | A1 | 10/2014 | Schmalstieg |
| 2015/0009214 | A1 | 1/2015 | Lee et al. |
| 2015/0142394 | A1 | 5/2015 | Mehr et al. |
| 2015/0213572 | A1 | 7/2015 | Loss |
| 2015/0262405 | A1 | 9/2015 | Black et al. |
| 2015/0269715 | A1 | 9/2015 | Jeong et al. |
| 2015/0279118 | A1 | 10/2015 | Dou et al. |
| 2015/0325044 | A1 | 11/2015 | Lebovitz |
| 2015/0371440 | A1 | 12/2015 | Pirchheim et al. |
| 2016/0071318 | A1 | 3/2016 | Lee et al. |
| 2016/0171765 | A1 | 6/2016 | Mehr |
| 2016/0173842 | A1 | 6/2016 | De La Cruz et al. |
| 2016/0239976 | A1 * | 8/2016 | Fathi ..................... G06T 7/579 |
| 2016/0358382 | A1 | 12/2016 | Lee et al. |
| 2017/0053447 | A1 | 2/2017 | Chen et al. |
| 2017/0054954 | A1 | 2/2017 | Keitler et al. |
| 2017/0221263 | A1 | 8/2017 | Wei et al. |
| 2017/0243397 | A1 | 8/2017 | Hou et al. |
| 2017/0278293 | A1 | 9/2017 | Hsu |
| 2017/0316597 | A1 | 11/2017 | Ceylan et al. |
| 2017/0337726 | A1 | 11/2017 | Bui et al. |
| 2018/0005015 | A1 | 1/2018 | Hou et al. |
| 2018/0025529 | A1 | 1/2018 | Wu et al. |
| 2018/0114363 | A1 | 4/2018 | Rosenbaum |
| 2018/0144535 | A1 | 5/2018 | Ford et al. |
| 2019/0068940 | A1 * | 2/2019 | Beardsley ............... G01C 21/20 |

FOREIGN PATENT DOCUMENTS

| | | |
|---|---|---|
| KR | 10-2011-0116671 A | 10/2011 |
| WO | 2006027339 A2 | 3/2006 |

OTHER PUBLICATIONS

Melax, S., "A Simple, Fast, and Effective Polygon Reduction Algorithm," Game Developer, Nov. 1998, pp. 44-49.

Myronenko, A. et al., "Point Set Registration: Coherent Point Drift," IEEE Transactions on Pattern Analysis and Machine Intelligence, vol. 32, No. 12, Dec. 2010, pp. 2262-2275.

Bookstein, F., "Principal Warps: Thin-Plate Splines and the Decomposition of Deformations," IEEE Transactions on Pattern Analysis and Machine Intelligence, vol. 11, No. 6, Jun. 1989, pp. 567-585.

Izadi, S. et al., "KinectFusion: Real-time 3D Reconstruction and Interaction Using a Moving Depth Camera," UIST '11, Oct. 16-19, 2011, 10 pages.

Papazov, C. et al., "An Efficient RANSAC for 3D Object Recognition in Noisy and Occluded Scenes," presented at Computer Vision—ACCV 2010—10th Asian Conference on Computer Vision, Queenstown, New Zealand, Nov. 8-12, 2010, 14 pages.

Biegelbauer, Georg et al., "Model-based 3D object detection—Efficient approach using superquadrics," Machine Vision and Applications, Jun. 2010, vol. 21, Issue 4, pp. 497-516.

Kanezaki, Asako et al., "High-speed 3D Object Recognition Using Additive Features in a Linear Subspace," 2010 IEEE International Conference on Robotics and Automation, Anchorage Convention District, May 3-8, 2010, pp. 3128-3134.

International Search Report and Written Opinion from PCT patent application No. PCT/US13/062292, dated Jan. 28, 2014, 10 pages.

International Search Report and Written Opinion from PCT patent application No. PCT/US14/045591, dated Nov. 5, 2014, 9 pages.

Sumner, R. et al., "Embedded Deformation for Shape Manipulation," Applied Geometry Group, ETH Zurich, SIGGRAPH 2007, 7 pages.

Rosten, Edward, et al., "Faster and better: a machine learning approach to corner detection," arXiv:08102.2434v1 [cs.CV], Oct. 14, 2008, available at https://arxiv.org/pdf/0810.2434.pdf, 35 pages.

Kim, Young Min, et al., "Guided Real-Time Scanning of Indoor Objects," Computer Graphics Forum, vol. 32, No. 7 (2013), 10 pages.

Rusinkewicz, Szymon, et al., "Real-time 3D model acquisition," ACM Transactions on Graphics (TOG) 21.3 (2002), pp. 438-446.

European Search Report from European patent application No. EP 15839160, dated Feb. 19, 2018, 8 pages.

Liu Song, et al. "Creating Simplified 3D Models with High Quality Textures," arXiv:1602.06645v1 [cs.GR], Feb. 22, 2016, 9 pages.

Stoll, C., et al., "Template Deformation for Point Cloud Filtering," Eurographics Symposium on Point-Based Graphics (2006), 9 pages.

Allen, Brett, et al., "The space of human body shapes: reconstruction and parameterization from range scans," ACM Transactions on Graphics (TOG), vol. 22, Issue 3, Jul. 2003, pp. 587-594.

International Search Report and Written Opinion from PCT patent application No. PCT/US15/49175, dated Feb. 19, 2016, 14 pages.

Harris, Chris & Mike Stephens, "A Combined Corner and Edge Detector," Plessey Research Rake Manor, U.K. (1988), pp. 147-151.

Bay, Herbert, et al., "Speeded-Up Robust Features (SURF)," Computer Vision and Image Understanding 110 (2008), pp. 346-359.

Rublee, Ethan, et al., "ORB: an efficient alternative to SIFT or SURF," Willow Garage, Menlo Park, CA (2011), available from http://citeseerx.ist.psu.edu/viewdoc/download?doi=10.1.1.370.4395&rep=rep1&type=pdf, 8 pages.

Lowe, David G., "Distinctive Image Features from Scale-Invariant Keypoints," International Journal of Computer Vision, vol. 60, Issue 2, Nov. 2004, pp. 91-110.

(56) References Cited

OTHER PUBLICATIONS

Kaess, Michael, et al., "iSAM: Incremental Smoothing and Mapping," IEEE Transactions on Robotics, Manuscript, Sep. 7, 2008, 14 pages.

Kummerle, Rainer, et al., "g2o: A General Framework for Graph Optimization," 2011 IEEE International Conference on Robotics and Automation, May 9-13, 2011, Shanghai, China, 7 pages.

* cited by examiner

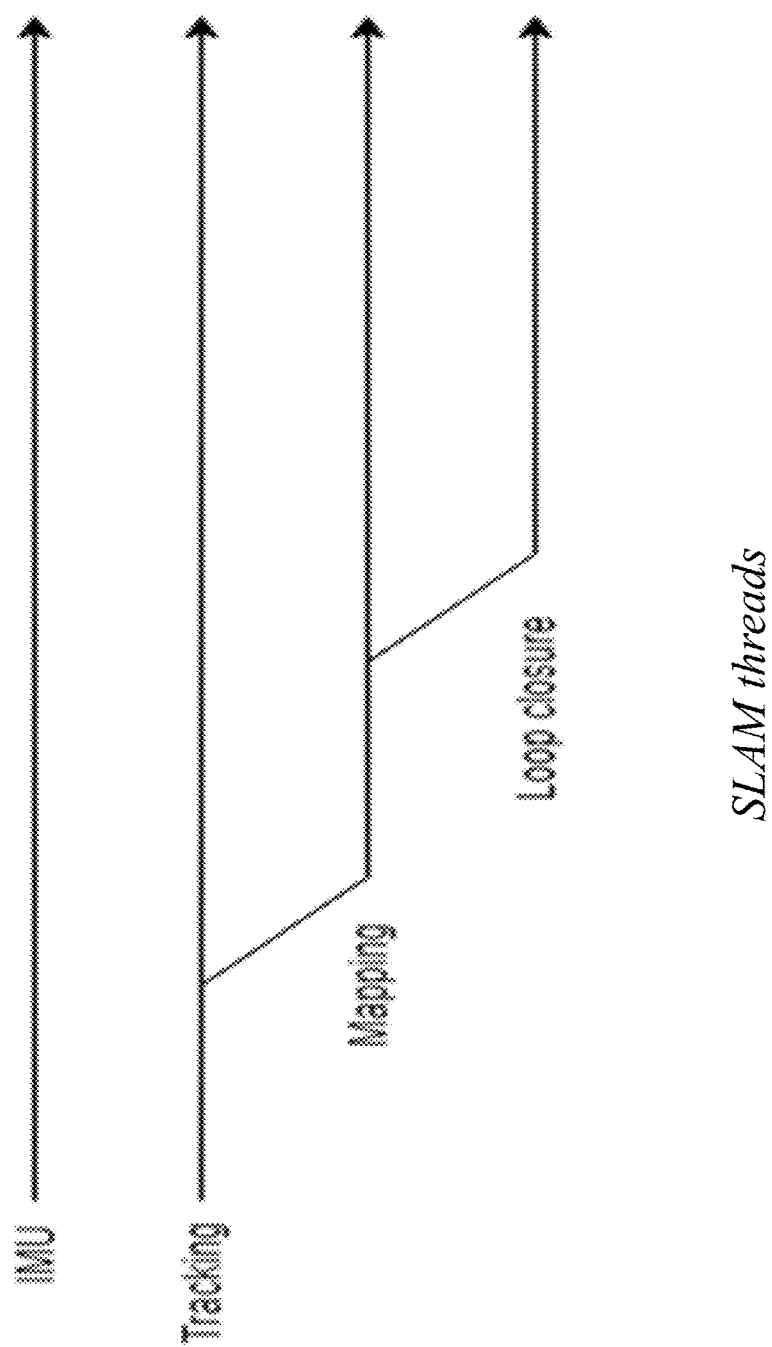

3D VISION PROCESSING USING AN IP BLOCK

RELATED APPLICATIONS

This application claims priority to U.S. Provisional Patent Application No. 62/645,752, filed on Mar. 20, 2018, the entirety of which is incorporated herein by reference.

TECHNICAL FIELD

This subject matter of this application relates generally to methods and apparatuses, including computer program products, for three-dimensional (3D) vision processing using an IP block (also called an IP core).

BACKGROUND

Vision processing has traditionally been done using a central processing unit (CPU), a graphics processing unit (GPU), or combination of both units as integrated into a computing device, such as a personal computer or server computing device. In some cases, a field-programmable gate array (FPGA) has been used in conjunction with the CPU and/or GPU to assist with the vision processing, especially when the processing is only needed for a short timeframe. A FPGA is an integrated circuit designed to be configured by a customer or a designer after manufacturing. The FPGA configuration is generally specified using a hardware description language (HDL). Some specific processing functions such as red-eye removal or color correction processing have been made into a custom image processing unit but such units are typically limited to one or two specific functions.

In some cases, an intellectual property (IP) block is used as part of the circuit design. An IP block, also known as an IP core or a semiconductor IP core, is a reusable unit of logic, cell or integrated circuit layout design that is the intellectual property of one party. IP blocks can be licensed to another party for use in a circuit, or IP blocks can be owned and used by a single party alone. The term is derived from the licensing of the patent and/or source code copyright that exists in the circuit design. IP blocks can be used as building blocks within FPGA logic designs or application-specific integrated circuit (ASIC) designs. An ASIC is an integrated circuit (IC) customized for a particular use, rather than intended for general-purpose use. For example, a chip that is designed to handle Ethernet physical layer communication, is an ASIC.

Even both ASICs and FPGAs use hardware description languages, such as VHDL (Very High Speed Integrated Circuit Hardware Description Language), Verilog or System Verilog, to develop, there are still a lot of differences between these two.

- The internal structure of ASICs is fully defined by the designers. But the internal structure of FPGAs is pre-defined blocks by the manufacturers.
- ASICs are fully customized. Both digital and analog circuits can be put into the chip, such as a chip with both A/D and D/A converters as well as digital filters built in. But FPGAs only handle digital designs.
- FPGAs are reconfigurable. But ASICs are not.
- FPGAs are more expensive per unit. ASICs are cheaper on a per-unit basis. But the cost of manufacturing ASICs is also very high. So, if only a small number of chips are needed, ASICs are not cheaper.

A traditional solution is for a camera to capture image data and transmit the data to vision processing software (e.g., OpenCV) stored on a computing device (e.g., computer). The vision processing software performs certain vision processing algorithms (e.g., Canny edge detection algorithm) on the data through use of a CPU/GPU in the computer.

These traditional approaches have worked fairly well for two-dimensional (2D) processing. However, with new vision processing applications such as augmented reality, measurement, and gesture recognition that can work with popular 3D sensors, e.g., from PrimeSense or Leap Motion, there is a need for 3D processing in real-time—which has not been realized in a satisfactory manner by traditional platforms.

As an example, MICROSOFT® KINECT®, available from Microsoft Corp. of Redmond, Wash., or similar motion sensing input and image capture devices use a custom hardware chip, programmed with specific vision processing algorithms, in order to process 3D data in real-time. Without such silicon-based algorithm processing, it would not be possible to provide real-time 3D processing which can then be used in a large number of applications.

The problem becomes even more acute when trying to implement vision processing applications in mobile or embedded devices, such as smart phones, tablet computers, small Linux devices, and the like. Generally, these devices have limited battery life, processing capability, and memory capacity. Hence, it is not practical to expect mobile and embedded devices to be able to process 3D vision algorithms in any satisfactory manner when real-time processing is required.

For example, power consumption is high for vision processing because most vision processing algorithms and processing units are computing intensive and use a lot of megaflops for the algorithm processing. Also, a lot of memory is needed to store data for vision processing, especially if the data is coming directly from a camera and is getting stored in the system memory. Raw data stream from such camera(s) can be as much as 200 Mbits/sec when converted to 3D data points. Further, most of these devices have processor cores based on the ARM architecture (e.g., developed by ARM Holdings, plc of Cambridge, England)—or something similar—which have a fraction of the processing capability of, e.g., high-end processors available from Intel Corp. of Santa Clara, Calif. that are used in laptops and desktops. However, high-end CPU processors lead to high power consumption, and shorten the battery life in mobile or embedded devices.

SUMMARY

Therefore, what is needed is an IP block hardware/logic design—typically implemented on an integrated circuit (e.g., semiconductor chip)—to be coupled between a camera and either a vision processing module executing on a computing device (e.g., a server) or a System on a Chip (SoC) (e.g., as used in mobile devices), where the IP block performs specific vision processing calculations and algorithms for the device to which the IP block is connected or embedded. As it is difficult to put all possible vision processing algorithms into a single IP block, the architecture and functionality of the IP block described herein includes selecting commonly-used computational equations that are used in vision processing and building those equations into the IP block as standard, programmed functions. The vision processing or other application software that interfaces with the IP block logic/hardware thus does not have to know the details of how the vision processing algorithms are implemented but can use the IP block to perform certain functions efficiently and rapidly. Exemplary computational capabilities of the IP block are described herein.

The architecture and implementation of the IP block described herein has several advantages over traditional approaches involving a CPU/GPU:

Power consumption and cost: Because the algorithm is implemented efficiently in the IP block logic/hardware, there is minimal waste—both in terms of amount of silicon used (which translates to cost) and power consumption.

Flexibility: Since the set of functions programmed into the IP block can be some of those most commonly used in vision processing algorithms, many different applications can take advantage of the IP block's logic/hardware functionality to make vision processing applications run faster.

Less memory: Because the camera input directly interfaces with the IP block (or other hardware upon which the IP block logic is embedded), the data is preprocessed by the algorithms programmed into the IP block and only the processed data is sent to the main memory of the vision processing computing device (e.g., server/SoC) for further processing. Of course, data can also be transmitted from the main memory to the IP block for further processing. Either way, the IP block can quickly cut down the amount of raw data into a manageable dataset that is a fraction of the original data.

Performance: The IP block can process the vision processing algorithms quickly using silicon hardware (as compared to the previous software approaches) that algorithm robustness no longer needs to be sacrificed. This improves the system's overall reliability and accuracy.

The invention, in one aspect, features a system for 3D vision processing. The system comprises a sensor device, a processor, a memory module, a network interface, and a vision processing module comprising an integrated circuit that performs one or more 3D vision processing algorithms and a plurality of controllers that couple the integrated circuit to each of: the sensor device, the processor, the memory module, and the network interface. The vision processing module receives image data from the sensor device, the image data corresponding to one or more images captured by the sensor device. The vision processing module executes one or more of the 3D vision processing algorithms using at least a portion of the image data as input. The vision processing module transmits an output from execution of one or more of the 3D vision processing algorithms to at least one of: the processor, the memory module, or the network interface.

The above aspect can include one or more of the following features. In some embodiments, the vision processing module comprises a field-programmable gate array (FPGA) or an application-specific integrated circuit (ASIC). In some embodiments, the 3D vision processing algorithms comprise simultaneous localization and mapping (SLAM) algorithms.

In some embodiments, the SLAM algorithms comprise a Build Pyramid function, a Key Point Detection function, and a Feature Calculation function. In some embodiments, for the Build Pyramid function, the vision processing module receives color and depth data and a timestamp associated with the color and depth data from the sensor device, generates a gray map comprising a plurality of levels, using the color and depth data and the timestamp, resizes the gray map, smooths a first level of the plurality of levels of the resized gray map, and determines whether to smooth all of the plurality of resized levels or to resize the smoothed first level. In some embodiments, for the Key Point Detection function, the vision processing module executes a features from accelerated segment test (FAST) corner detection algorithm with non-maxima suppression on the resized gray map to detect one or more key points in the resized gray map, and determines whether one or more key points have been detected in each of the plurality of levels in the resized gray map. In some embodiments, for the Feature Calculation function, the vision processing module performs moment calculation on each detected key point to generate M01 and M10 values for the key point, calculates a magnitude value for each key point using the corresponding M01 and M10 values, rotates trained pattern coordinates for each key point based upon the M01 and M10 values and the magnitude for the corresponding key point, and calculates final ORB values using the rotated trained pattern coordinates.

In some embodiments, the vision processing module transmits the final ORB value, the M01 value, the M10 value, and the magnitude value of each key point to the processor, and the processor generates an intensity angle for the corresponding key point based upon the magnitude value, the M01 value and the M10 value of the key point. In some embodiments, the vision processing module comprises one instance of each of the Build Pyramid function, the Key Point Detection function, and the Feature Calculation function. In some embodiments, the vision processing module comprises a plurality of instances of each of the Build Pyramid function, the Key Point Detection function, and the Feature Calculation function.

In some embodiments, the processor, the memory module, the sensor device and the vision processing module are embedded in a System-on-Chip (SoC). In some embodiments, the SoC is embedded in a mobile computing device. In some embodiments, the processor, the memory module, the sensor device and the vision processing module are coupled to each other via a system bus. In some embodiments, the network interface couples the vision processing module to a remote computing device. In some embodiments, at least a portion of one or more of the 3D vision processing algorithms is executed by the processor in coordination with the vision processing module. In some embodiments, the sensor device is a camera.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 1A is a diagram of exemplary threads in a Simultaneous Localization and Mapping (SLAM) module.

DETAILED DESCRIPTION

Certain embodiments of the systems and methods described in this application utilize:

- the real-time object recognition and modeling techniques as described in U.S. Pat. No. 9,715,761, titled "Real-Time 3D Computer Vision Processing Engine for Object Recognition, Reconstruction, and Analysis;"
- the dynamic 3D modeling techniques as described in U.S. patent application Ser. No. 14/849,172, titled "Real-Time Dynamic Three-Dimensional Adaptive Object Recognition and Model Reconstruction;"
- the shape-based registration and modeling techniques described in U.S. Pat. No. 10,169,676, titled "Shape-Based Registration for Non-Rigid Objects with Large Holes;"
- the 3D photogrammetry techniques described in U.S. Pat. No. 10,192,347, titled "3D Photogrammetry;"
- the sparse SLAM techniques described in U.S. patent application Ser. No. 15/638,278, titled "Sparse Simultaneous Localization and Mapping with Unified Tracking;"
- the 2D and 3D video compression techniques described in U.S. patent application Ser. No. 15/726,316, titled "Real-Time Remote Collaboration and Virtual Presence using Simultaneous Localization and Mapping to Construct a 3D Model and Update a Scene Based on Sparse Data;" and
- the 4D hologram technology described in U.S. patent application Ser. No. 16/240,404, titled "4D Hologram: Real-Time Remote Avatar Creation and Animation Control."

Each of the above-referenced patents and patent applications is incorporated by reference herein in its entirety. In addition, the methods and systems described herein can utilize the 3D vision processing core and related technology as described in U.S. Pat. No. 8,995,756, titled "3D Vision Processing" and incorporated herein by reference.

In some embodiments described herein, the IP block is designed to implement Simultaneous Localization and Mapping (SLAM) processing algorithms. In traditional SLAM implementations, a CPU executes four major threads—Inertial Measurement Unit (IMU), Tracking, Mapping, and Loop closure. As shown in FIG. 1A, IMU and Tracking threads always run. The Mapping thread is started by the Tracking thread, if necessary. And, the Mapping thread starts the Loop closure thread, if necessary.

Figure 1B:
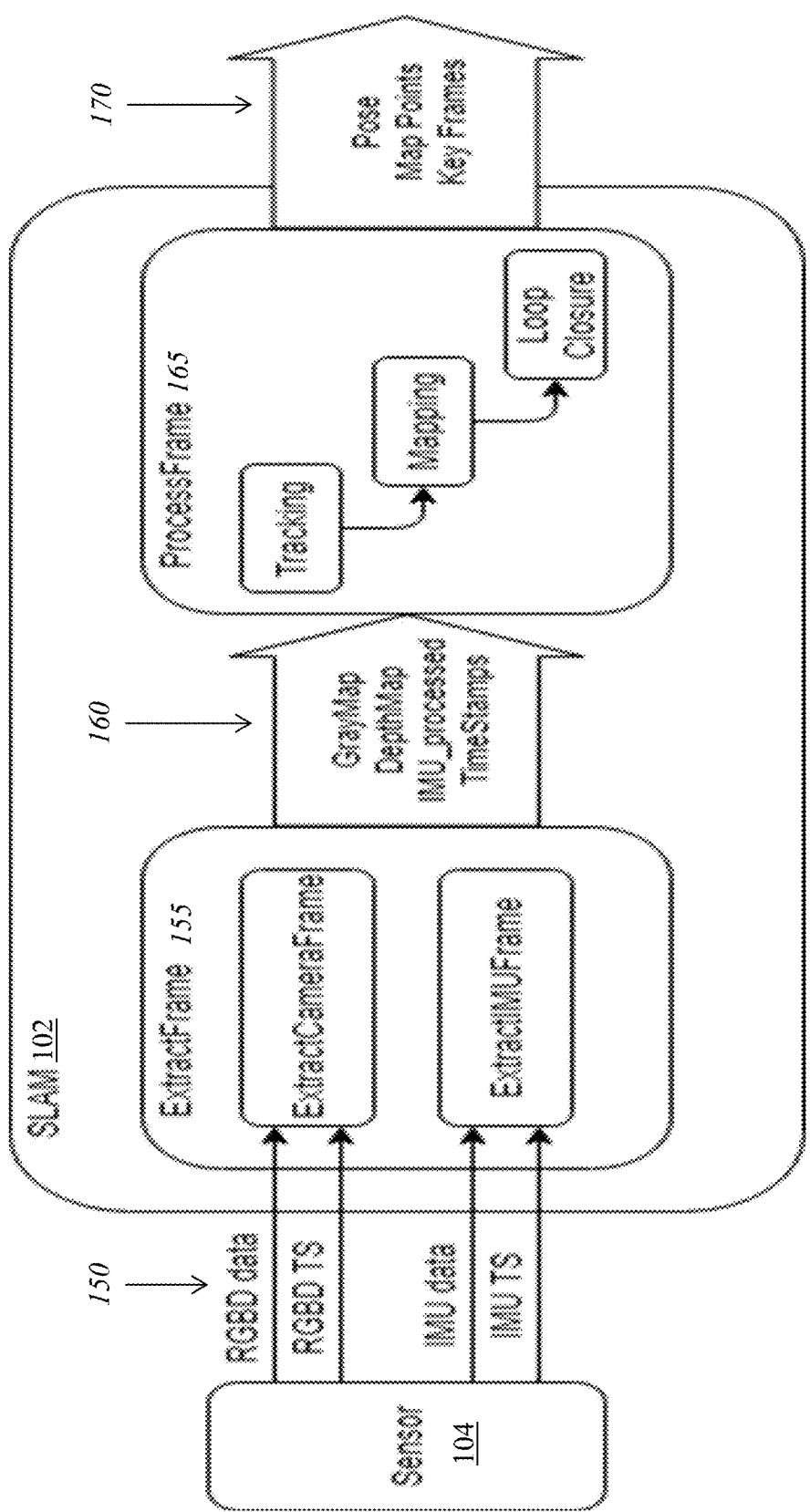
FIG. 1B is a flow diagram of vision processing performed by a SLAM module.

FIG. 1B is a flow diagram of vision processing performed by a SLAM module 102. As shown in FIG. 1B, a sensor device 104 transmits (150) color and depth data (RGBD data), a timestamp associated with the color and depth data (RGBD TS), IMU raw data (IMU data), and a timestamp associated with the raw IMU data (IMU TS) if IMU functionality is available, to the SLAM module 102. The SLAM module 102 performs (155) an ExtractFrame function to extract the Camera Frame using the RGBD data and RGBD TS, and performs an ExtractIMUFrame function to extract the IMU frame using the IMU data and IMU TS. The SLAM module 102 generates (160) a Gray Map, Depth Map, processed IMU data, and Time Stamps—which are used in a ProcessFrame function (165) (that executes Tracking, Mapping, and Loop Closure) to generate (170) pose information, map points, and key frames as output (e.g., to an external computing device for further processing). Exemplary pseudocode for this process is provided below:

```
void ExtractFrame( ) {
    StartExtractIMUFrameThread( );  // This will start an
        ExtractIMUFrame thread.
    StartExtractCameraFrameThread( );  // This will start an
        ExtractCameraFrame thread.
    ... }
void StartExtractIMUFrameThread( ) {
    RequestIMURawDataFromSensor( );  // This will request the
        raw IMU data from the sensor.
    ProcessIMURawData( );  // This will get the processed IMU
        data and timestamp.
    ... }
void StartExtractCameraFrameThread( ) {
    RequestRGBDAndTS( );  // This will request RGBD data and
        timestamp from the sensor.
    ProcessRGBDAndTS( );  // This will get GrayMap, DepthMap and
        timestamp.
    ProcessFrame(GrayMap, DepthMap, IMU_processed, Timestamps);
        // This will process the current frame.
    OutputPose( );  // This will output the current pose data.
    ... }
```

Figure 1C:
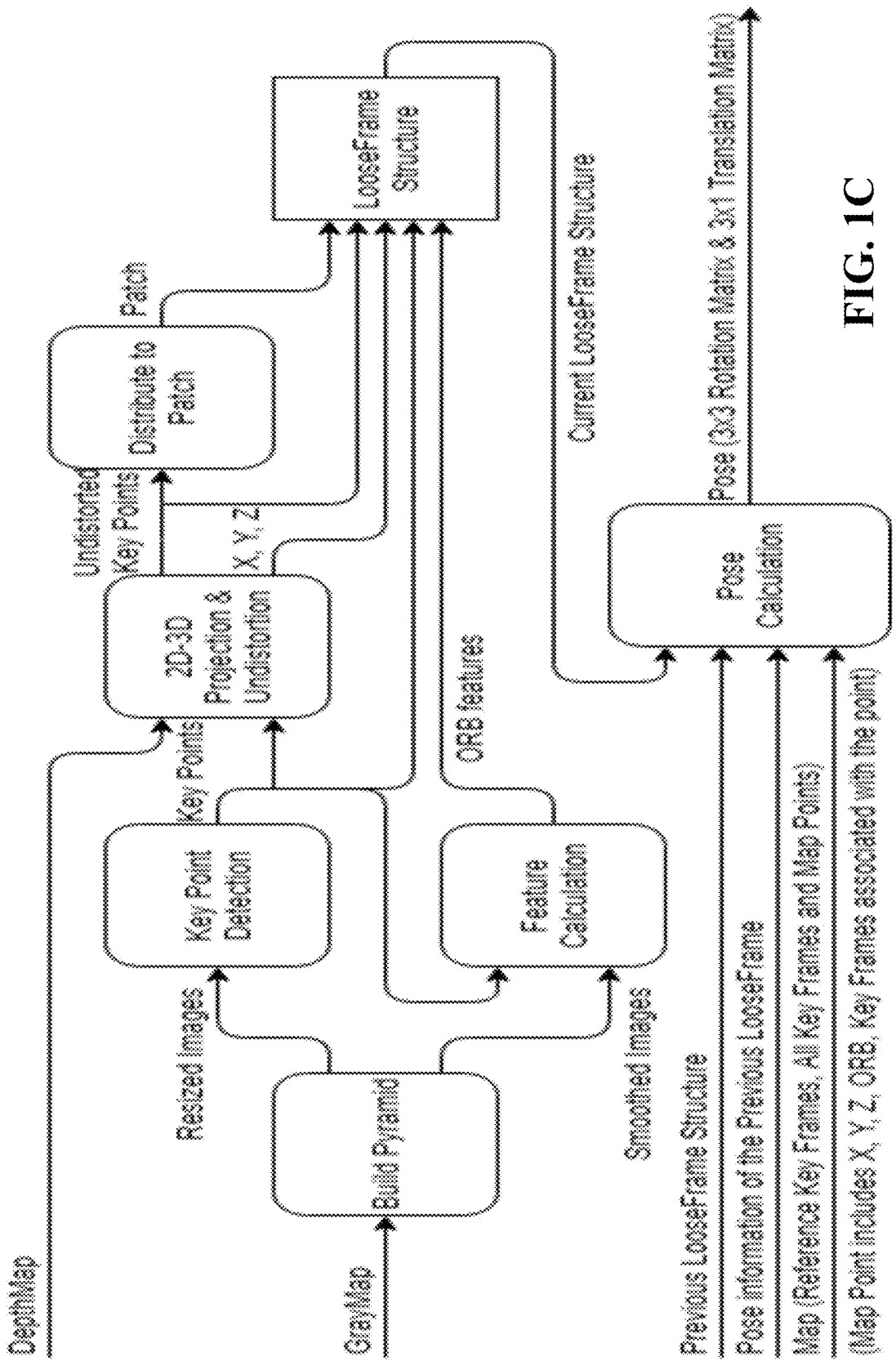
FIG. 1C is a flow diagram of the Tracking step in the ProcessFrame function of the SLAM module.

FIG. 1C is a flow diagram of the Tracking step in the ProcessFrame function of the SLAM module 102 of FIG. 1B. Note that FIG. 1C does not incorporate the IMU functions shown in FIG. 1B. As shown in FIG. 1C, after the ExtractCameraFrame block, the Gray Map is generated and passed to BuildPyramid block. To simulate different scales, the SLAM module 102 resizes the original input Gray Map to different levels. Because ORB feature calculation needs smoothed images, the original input Gray Map—as well as all resized images—are smoothed using a Gaussian blur function. After key points are detected, they are recorded and passed to calculate ORB features, to project to global X, Y, Z coordinates and to be undistorted and distributed. After finishing all of these, the LooseFrame structure is created. Using this structure as well as previous LooseFrame structure, the Pose information of the previous LooseFrame structure and Map, the pose of the current frame is calculated. Exemplary pseudocode for the LooseFrame and ProcessFrame functions is provided below:

```
typedef struct {
    KeyPoints;
    X_Y_Z;
    UndistortedKeyPoints;
    Patch;
    ORBFeatures; } LooseFrame
void ProcessFrame(GrayMap, DepthMap, IMU_processed, TimeStamps)
{
```

-continued

```
LooseFrame cur_lfs;   // This defines the current LooseFrame
    structure data.
Images *ResizedImages, *SmoothedImages;
BuildPyramid(GrayMap, ResizedImages, SmoothedImages);   //
    This will generate resized images and smoothed images
    using the input gray map.
KeyPointDetection(ResizedImages, &cur_lfs.KeyPoints);   //
    This will generate key points using resized images.
FeatureCalculation(SmoothedImages, &cur_lfs.KeyPoints,
    &cur_lfs.ORBFeatures);   // This will generate ORB
    features using generated key points.
ProjectionUndistortion(DepthMap, &cur_lfs.KeyPoints,
    &cur_lfs.X_Y_Z, &cur_lfs.UndistortedKeyPoints);   //
    This will generate X_Y_Z and undistorted key points
    using the input depth map and generated key points.
DistributeToPatch(&cur_lfs.UndistortedKeyPoints,
    &cur_lfs.Patch);   // This will generate the patch
    using generated undistorted key points.
LooseFrame pre_lfs;   // This defines the previous
    LooseFrame structure data.
Pose cur_pose, pre_pose;   // This defines the current and
    previous pose data.
Map map;   // This defines the map data
GetPreLooseFrameData(&pre_lfs);   // This will get the
    previous LooseFrame structure data.
GetPrePoseData(&pre_pose);   // This will get the previous
    pose data.
GetMap(&map);   // This will get map data.
PoseCalculation(&cur_lfs, &pre_lfs, &pre_pose, &map);   //
    This will generate the current pose data using the
    current LooseFrame structure data, the previous
    LooseFrame structure data, the previous pose data and
    map data.
... }
```

Figure 2:
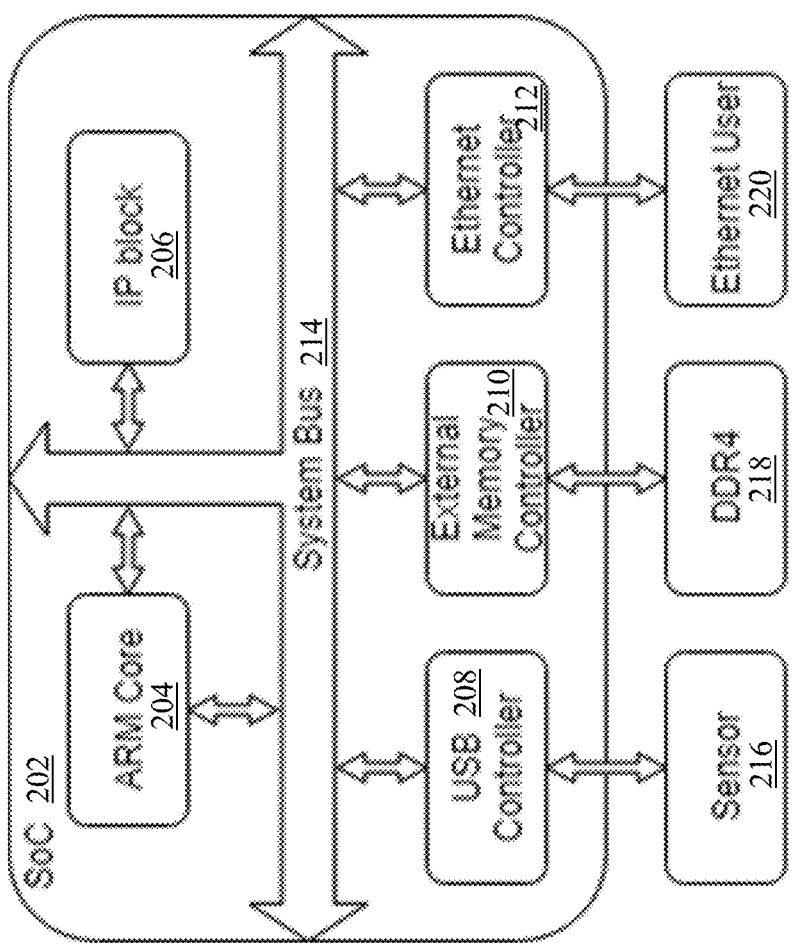
FIG. 2 is a block diagram of a system for 3D vision processing, where an IP block is implemented in a system-on-chip (SoC) design.

FIG. 2 is a block diagram of a system 200 for 3D vision processing, where an IP block is implemented in a system-on-chip (SoC) design. The system 200 comprises a SoC 202 that includes a number of different components, including an ARM core 204, an IP block 206 that implements vision processing algorithms, a USB controller 208 that enables the SoC to connect to a sensor device 216, an external memory controller 210 that enables the SoC to connect to one or more external memory modules 218 (e.g., DDR4 memory), and an Ethernet controller 212 that enables the SoC to connect to an external computing device 220 such as a server (also called an Ethernet user). The components 204, 206, 208, 210 and 212 of the SoC 202 are connected to each other via a system bus 214.

Generally, the IP block 206 takes input from the sensor device 216, processes the input using one or more vision processing algorithms programmed or designed into the IP block, sends corresponding output to the Ethernet user 220, and reads to/writes from the external memory 218. In some embodiments, a portion of the functionality programmed into the IP block 206 can be implemented in a CPU or other processing module coupled to the SoC to increase the efficiency and speed of the vision processing. As a result, the IP block 206 can be configured to include different interfaces to handle all of these functions. Depending on the target device, the IP block 206 may need fewer or more interfaces. For example, in certain SoC designs, all external interfaces (e.g., interfaces 208, 210, 212) can be handled by a CPU or other processing module coupled to the SoC, and the IP block 206 can require just one interface to communicate with the CPU.

Figure 3:
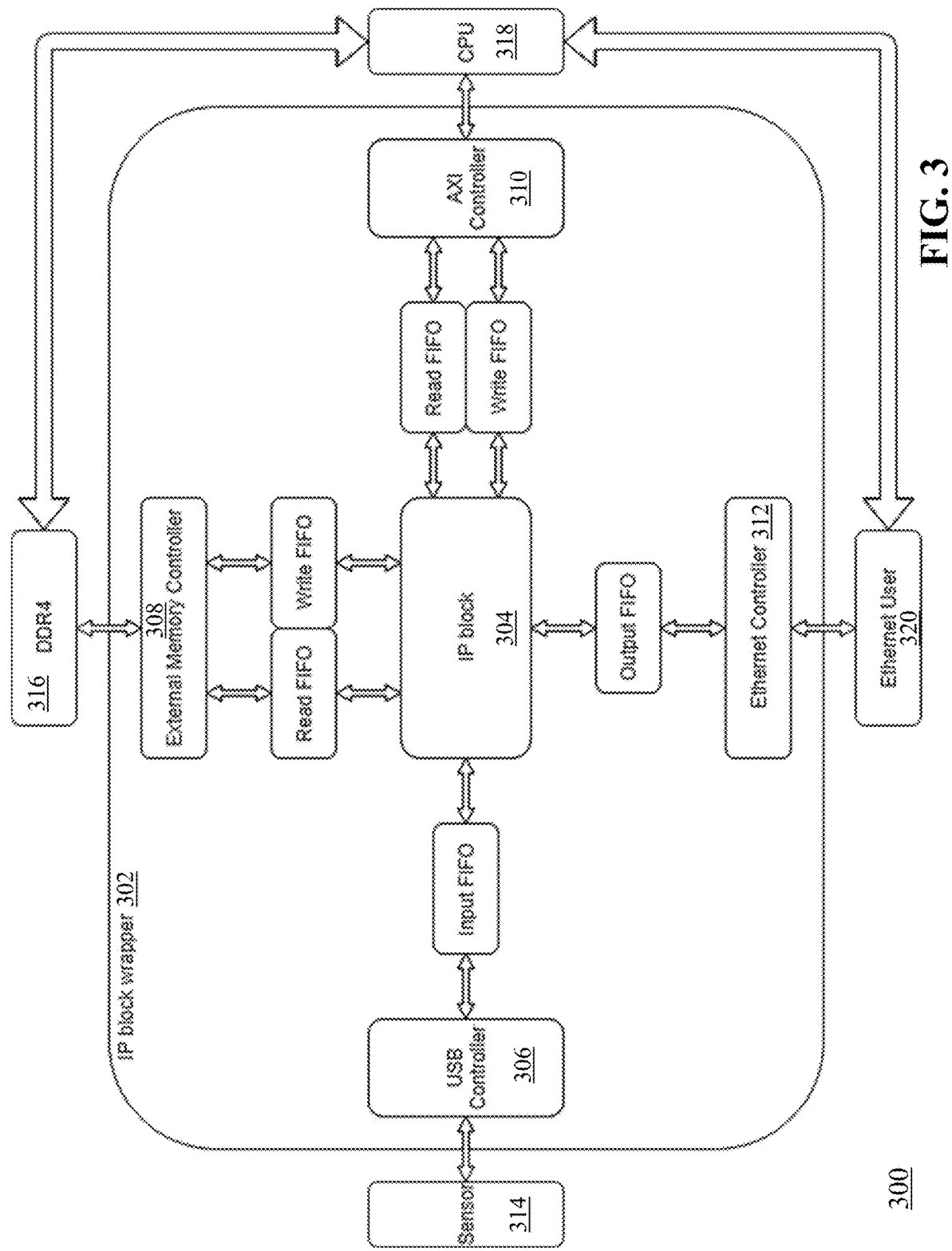
FIG. 3 is a block diagram of a system for 3D vision processing, where an IP block is implemented in a non-SoC design.

FIG. 3 is a block diagram of a system 300 for 3D vision processing, where an IP block is implemented in a non-SoC design (e.g., a FPGA or ASIC). The system 300 comprises an IP block wrapper 302 (i.e., a module that coordinates the functionality and communication between the IP block and external resources) with a number of different components, including an IP block 304 that implements vision processing algorithms, a USB controller 306 that enables the IP block to connect to a sensor device 314, an external memory controller 308 that enables the IP block to connect to external memory modules 316 (e.g., DDR4 memory), an Advanced Extensible Interface (AXI) controller 310 that enables the IP block to connect to a CPU 318, and an Ethernet controller 312 that enables the IP block to connect to an external computing device such as a server 320 (also called an Ethernet user).

In a non-SoC design, the IP block 304 is configured with different interfaces 306, 308, 310, 312 to communicate with the sensor device, external memory, CPU, Ethernet port, and the like. Moreover, different FPGA vendors have different interfaces, such as AXI from Xilinx, Inc. and ASI (Asynchronous Serial Interface) from Intel Corp. In such embodiments, the IP block does not directly handle any specific interface. Instead, the IP block wrapper 302 is implemented to handle these interfaces depending on the target device. In these embodiments (such as the one shown in FIG. 3), the IP block 304 uses standard first-in-first-out (FIFO) interfaces to communicate with external resources and devices via the wrapper 302.

Figure 4:
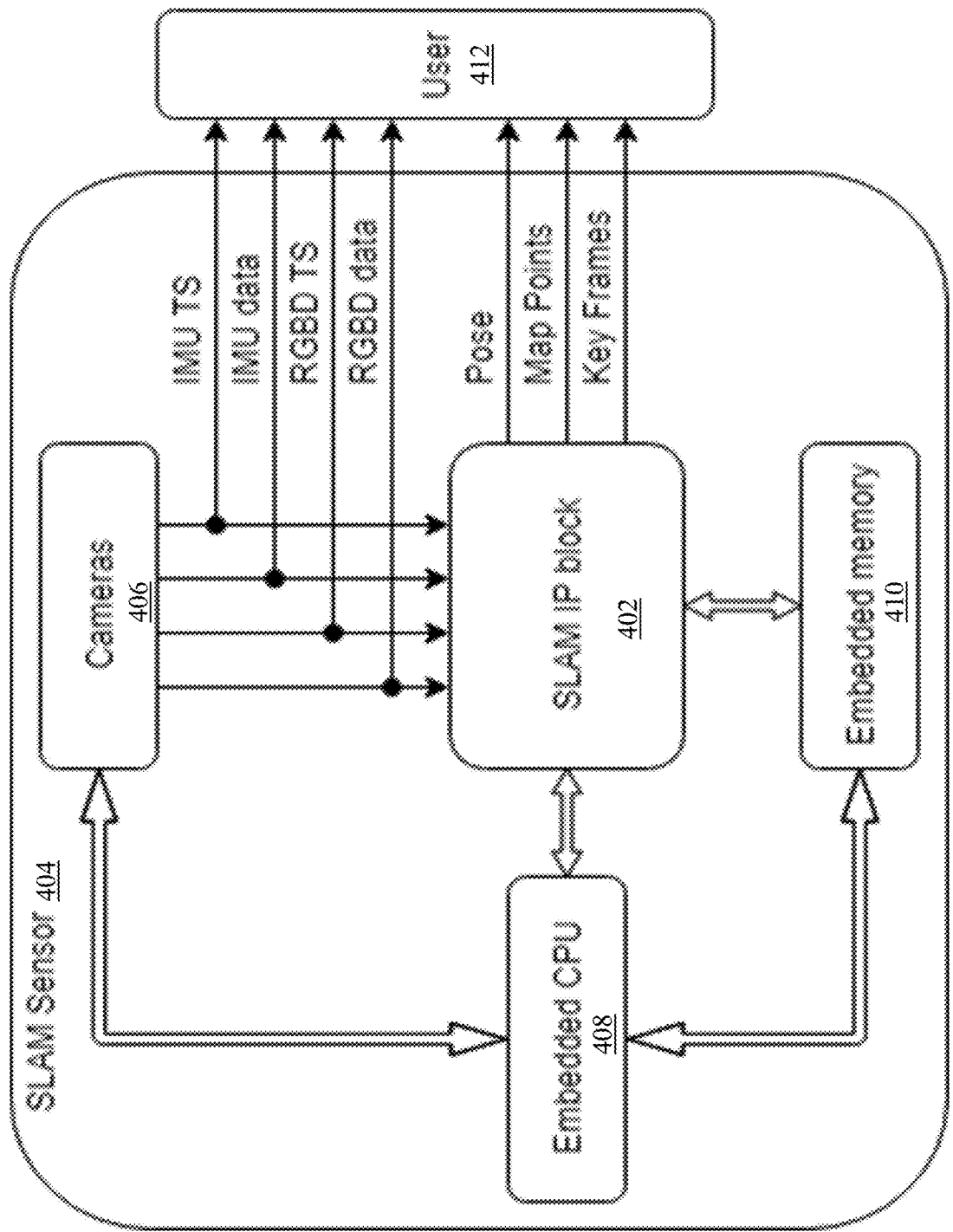
FIG. 4 is a block diagram of a system for SLAM processing, where a SLAM IP block is integrated into a sensor device.

FIG. 4 is a block diagram of a system 400 for SLAM processing, where a SLAM IP block 402 is integrated into a sensor device 404. The sensor device 404 includes the SLAM IP block 402 that performs SLAM vision processing algorithms using the RGBD data, RGBD TS, IMU data, and IMU TS received from an embedded camera 406 to generate pose information of the current frame and/or pose information with map points and key frames. The SLAM IP block 402 interfaces with an embedded CPU 408 and embedded memory 410 in the sensor device in performing the vision processing functions. As a result, the SLAM sensor 404 can output the RGBD data and IMU data, along with the pose, map points and key frames, to an external device 412—thereby eliminating the need for separate external SLAM processing.

In some embodiments, it may be necessary to partition certain SLAM functions—such that some SLAM functions are part of an IP block, while other SLAM functions are performed by a processor or other module that is outside the IP block. For example, compared to a CPU, FPGAs are typically not good at performing complicated algorithms, such as floating-point calculations, trigonometric functions, logarithm functions, and the like. This does not mean that a FPGA cannot perform them, but performing them is generally harder and more costly in FPGAs than in CPUs. Therefore, in some embodiments, an IP block can comprise the Build Pyramid, Key Point Detection and a portion of the Feature Calculation functions (see FIG. 1C). In other embodiments, depending on the structure of and resources available in the FPGA, an IP block can include the ExtractFrame and the LooseFrame Structure creation. In the latter embodiments, the data path is clearer because all data from the sensor device is handled by the IP block, and the CPU does not require any data directly from the sensor device.

For the embodiments that have Build Pyramid, Key Point Detection and a part of Feature Calculation in the IP block, the input of the IP block is the Gray Map (from the sensor device) and the output of the IP block is the Key Points, which contain row, column and score, and M01, M10 values of Key Points (which are for calculating intensity angles), and ORB values where each value contains 256-bit data. It should be appreciated that FPGAs do not need to stick with a fixed data width, such as 16 bits or 32 bits. Instead, FPGAs can have any data width, such as 9 bits or 17 bits. However, because FPGAs need to work with the CPU, the data width between the FPGA and the CPU has to be well defined. Internally, the FPGA can use any optimized data width based on the target device. For example, Xilinx 7 series has a built-in 25×18 multiplier and Intel Stratix 10 has a built-in 18×19 multiplier. It should be noted that generally 19×19 multiplication should not be used in either device.

Figure 5:
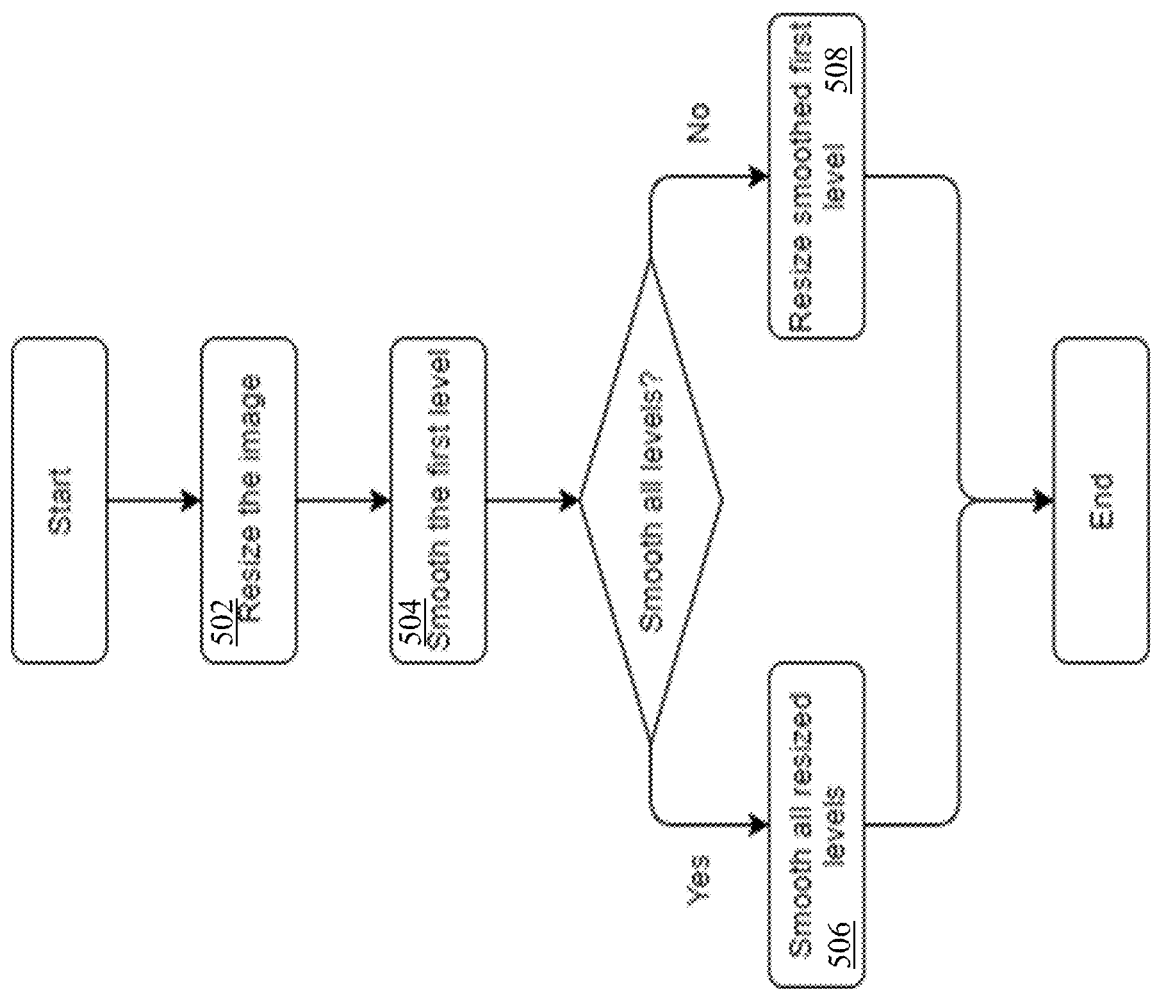
FIG. 5 is a flow diagram of the Build Pyramid function of a SLAM IP block.

FIG. 5 is a flow diagram of the Build Pyramid function of a SLAM IP block. As shown in FIG. 5, the SLAM IP block resizes (502) the input Gray Map of the image and smooths (504) the first level of the resized Gray Map. The SLAM IP block can determine whether to smooth (506) all resized levels or to resize (508) the smoothed first level. Generally, better results are obtained if all resized levels are smoothed. Exemplary pseudocode for the Build Pyramid function is provided below:

```
void BuildPyramid(GrayMap, ResizedImages, SmoothedImages) {
    bool smooth_all_levels = CheckIfSmoothAllLevels( );  // This
        will check if all levels need to be smoothed or only
        the first level needs to be smoothed.
    int num_levels = GetNumLevels( );  // This will get the
        total number of levels.
    Smooth(GrayMap, &SmoothedImages[0]);  // This will smooth
        the first level.
    Copy(GrayMap, &ResizedImages[0]);  // This will copy the
        input gray map into the first level.
    for (int i = 1; i < num_levels; i++) {
        Resize(&ResizedImages[i-1], &ResizedImages[i]);  //
            This will resize images one by one.
    }
    if (smooth_all_levels) {
        for (int i = 1; i < num_levels; i++) {
            Smooth(ResizedImages[i], &SmoothedImages[i]);  //
                This will smooth all levels.
        }
    }
    else {
        for (int i = 1; i < num_levels; i++) {
            Resize(&SmoothedImages[i-1], &SmoothedImages[i]);
                // This will resize the smoothed images one
                by one.
        }
    }
}
```

Figure 6:
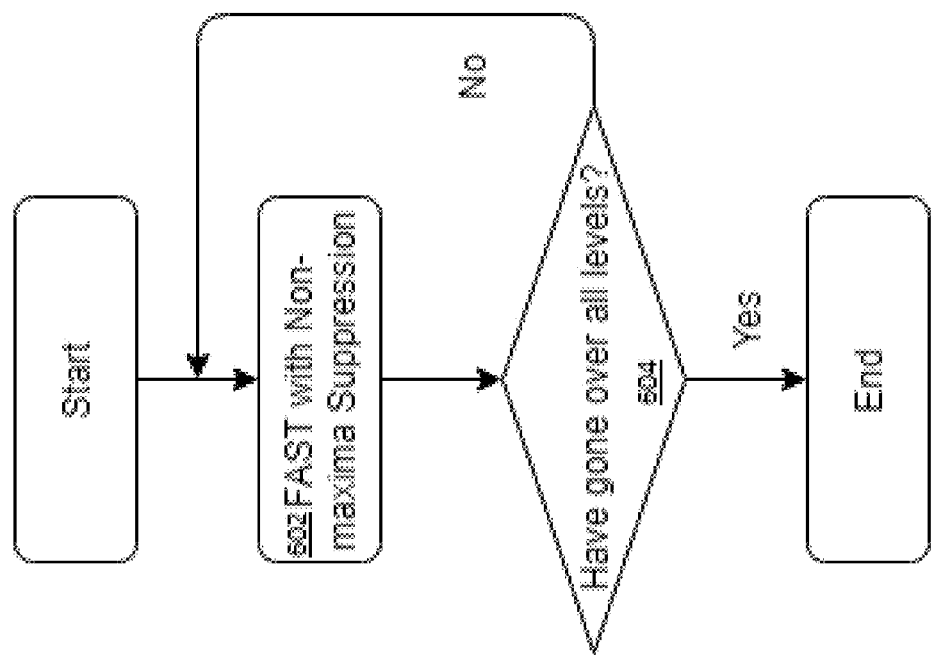
FIG. 6 is a flow diagram of the Key Point Detection function of a SLAM IP block.

FIG. 6 is a flow diagram of the Key Point Detection function of a SLAM IP block. As shown in FIG. 6, the SLAM IP block uses (602) features from accelerated segment (FAST) corner detection with non-maxima suppression to detect key points in the resized Gray Map. An exemplary FAST algorithm used during Key Point Detection is described in E. Rosten et al., "Faster and better: a machine learning approach to corner detection," IEEE Trans. Pattern Analysis and Machine Intelligence (Oct. 14, 2008) (available at https://arxiv.org/pdf/0810.2434), which is incorporated herein by reference. The SLAM IP block can determine (604) whether key points have been detected in all levels. Exemplary pseudocode for the Key Point Detection function is provided below:

```
void KeyPointDetection(ResizedImages, KeyPoints) {
    int num_levels = GetNumLevels( );  // This will get the
        total number of levels.
    for (int i = 0; i < num_levels; i++) {
        FASTAndNonmaximaSuppression(&ResizedImages[i],
            &KeyPoints[i]);  // This will generate key points
            level by level.
    }
}
```

Figure 7A:
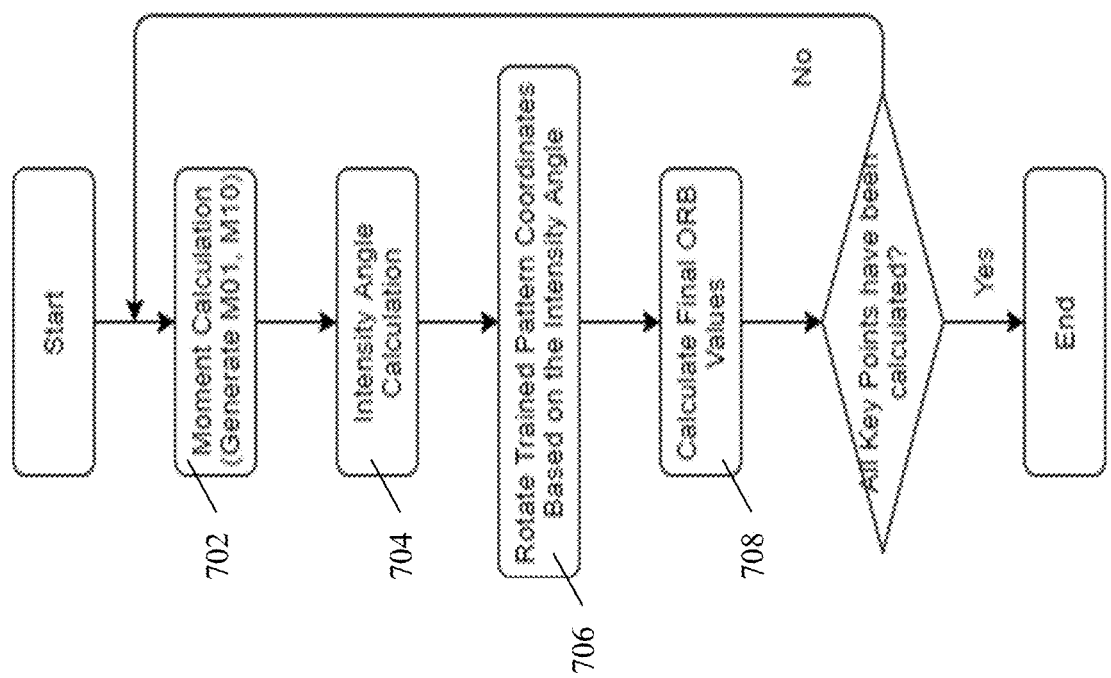
FIG. 7A is a flow diagram for ORB feature calculation using a CPU.
Figure 7B:
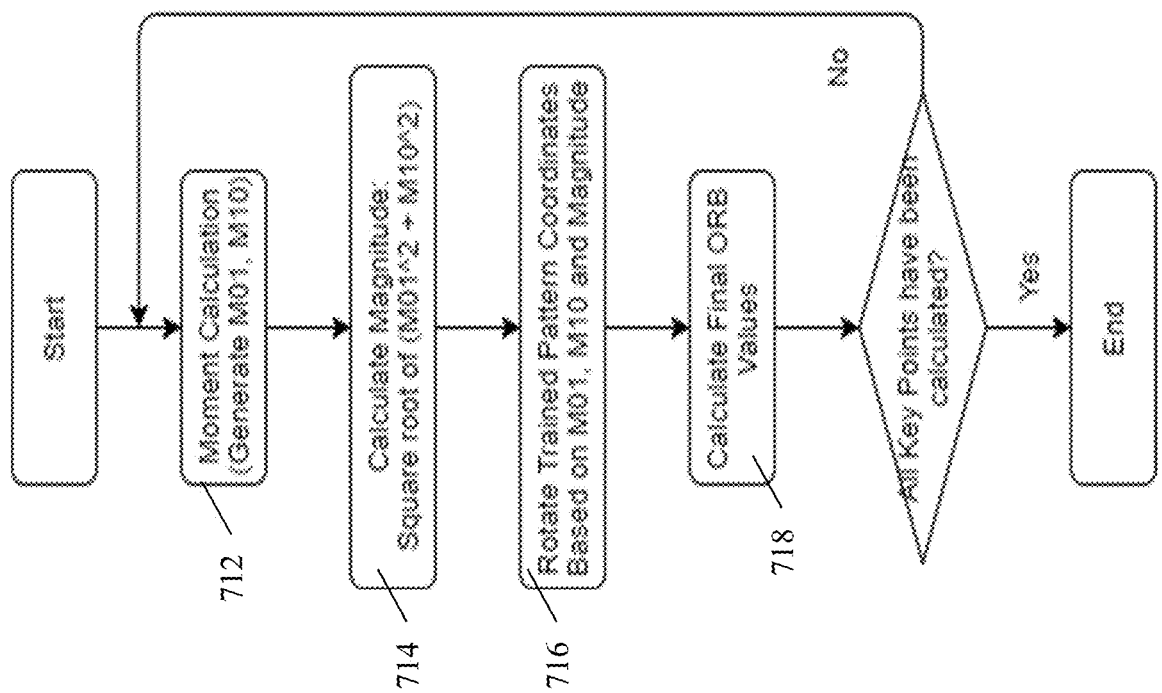
FIG. 7B is a flow diagram for ORB feature calculation using a SLAM IP block.

FIGS. 7A and 7B are flow diagrams of the Feature Calculation function. As mentioned above, in some embodiments a portion of the Feature Calculation function—namely the ORB feature calculation—is incorporated into the SLAM IP block. As a result, FIG. 7A is a flow diagram for ORB feature calculation using a CPU while FIG. 7B is a flow diagram for ORB feature calculation using the SLAM IP block.

For FIG. 7A, the CPU performs intensity angle calculation and ORB value calculation. In the intensity angle calculation, the CPU performs (702) moment calculation to calculate M01 and M10 values and calculates (704) the intensity angle. In the ORB value calculation, the CPU rotates (706) the trained pattern coordinates based upon the intensity angle and calculates (708) the final ORB value. The CPU repeats this process until all key points have been calculated. The output of ORB contains intensity angles and 256-bit ORB values. An exemplary ORB algorithm used during the Feature Calculation function is described in E. Rublee et al., "ORB: an efficient alternative to SIFT or SURF," ICCV '11 Proceedings of the 2011 International Conference on Computer Vision, pp. 2564-2571 (2011), which is incorporated herein by reference. Exemplary pseudocode for the Feature Calculation function in CPU is provided below:

```
void FeatureCalculationCPU(SmoothedImages, KeyPoints,
ORBFeatures) {
    int num_levels = GetNumLevels( );  // This will get the
        total number of levels.
    for (int i = 0; i < num_levels; i++) {
        for (int j = 0; j < KeyPoints[i].size( ); j++) {
            int M01, M10;
            MomentCalculation(&SmoothedImages[i],
                &KeyPoints[i][j], &M01, &M10);  // This will
                calculate M01 and M10 of each key point in
                all levels using corresponding smoothed
                images.
            ORBFeatures[i][j].IntensityAngle =
                IntensityAngleCalculation(&M01, &M10);  //
                This will generate the intensity angle of
                the key point.
            RotateTrainedPattern(&ORBFeatures[i][j].Intensity
                Angle);  // This will rotate the trained
                pattern using calculated intensity angle of
                the key point.
            CalculateORBValue(&ORBFeatures[i][j].ORBValue);
                // This will generate the final ORB value of
                the key point.
        }
    }
}
```

For FIG. 7B, the SLAM IP block performs moment calculation, trained pattern coordinates rotation and final ORB value calculation. Because intensity angle calculation involves a lot of floating-point calculation, it is performed by a CPU coupled to the SLAM IP block. The SLAM IP block performs (712) moment calculation to generate M01 and M10, which are used by the CPU to calculate the intensity angle. The SLAM IP block calculates (714) the magnitude (square root of $M01^2+M10^2$). The SLAM IP block rotates (716) the trained pattern coordinates based upon M01, M10 and the magnitude, and calculates (718) the final ORB values. The SLAM IP block repeats this process until all key points have been calculated. The output of ORB contains the M01 values, M10 values and 256-bit ORB values. As mentioned above, the CPU (or embedded CPU) calculates intensity angles using the M01 and M10 values. Exemplary pseudocode for the Feature Calculation function in the SLAM IP block is provided below:

```
void FeatureCalculationIPBlock(SmoothedImages, KeyPoints,
ORBFeatures, M01M10) {
    int num_levels = GetNumLevels( );  // This will get the
```

```
            total number of levels.
    for (int i = 0; i < num_levels; i++) {
        for (int j = 0; j < KeyPoints[i].size( ); j++) {
            MomentCalculation(&SmoothedImages[i],
                &KeyPoints[i][j], &M01M10[i][j]);   // This
                will calculate M01 and M10 of each key point
                in all levels using corresponding smoothed
                images.
            int Magnitude =
                CalculateMagnitude(&M01M10[i][j]);   // This
                will generate the magnitude using M01 and
                M10 values.
            RotateTrainedPattern(&M01M10[i][j], Magnitude);
                // This will rotate the trained pattern
                using calculated magnitude and M01, M10
                values of the key point.
            CalculateORBValue(&ORBFeatures[i][j].ORBValue);
                // This will generate the final ORB value of
                the key point.
        }
    }
}
```

Figure 8:
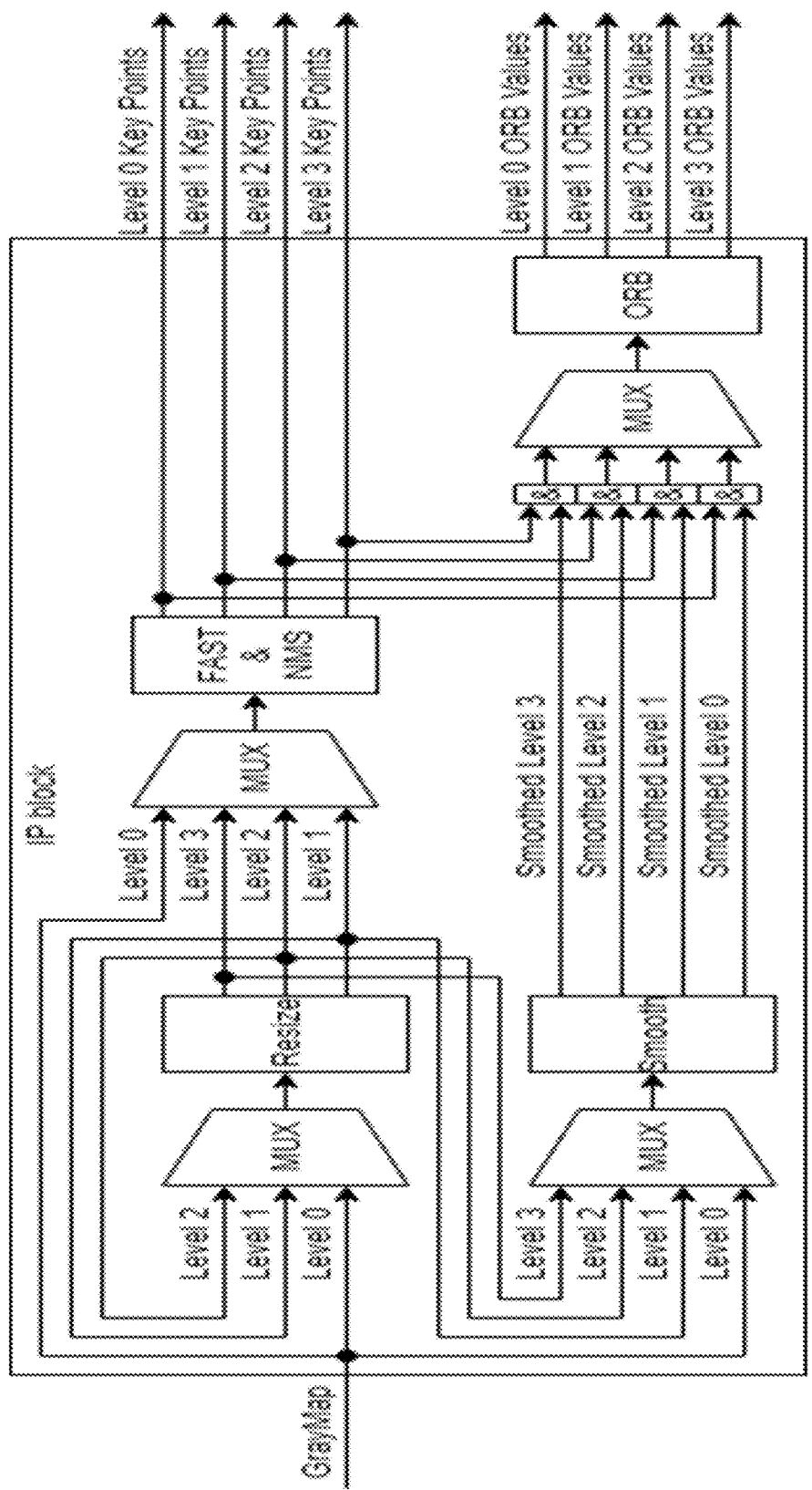
FIG. 8 is a single-instance IP block.
Figure 9:
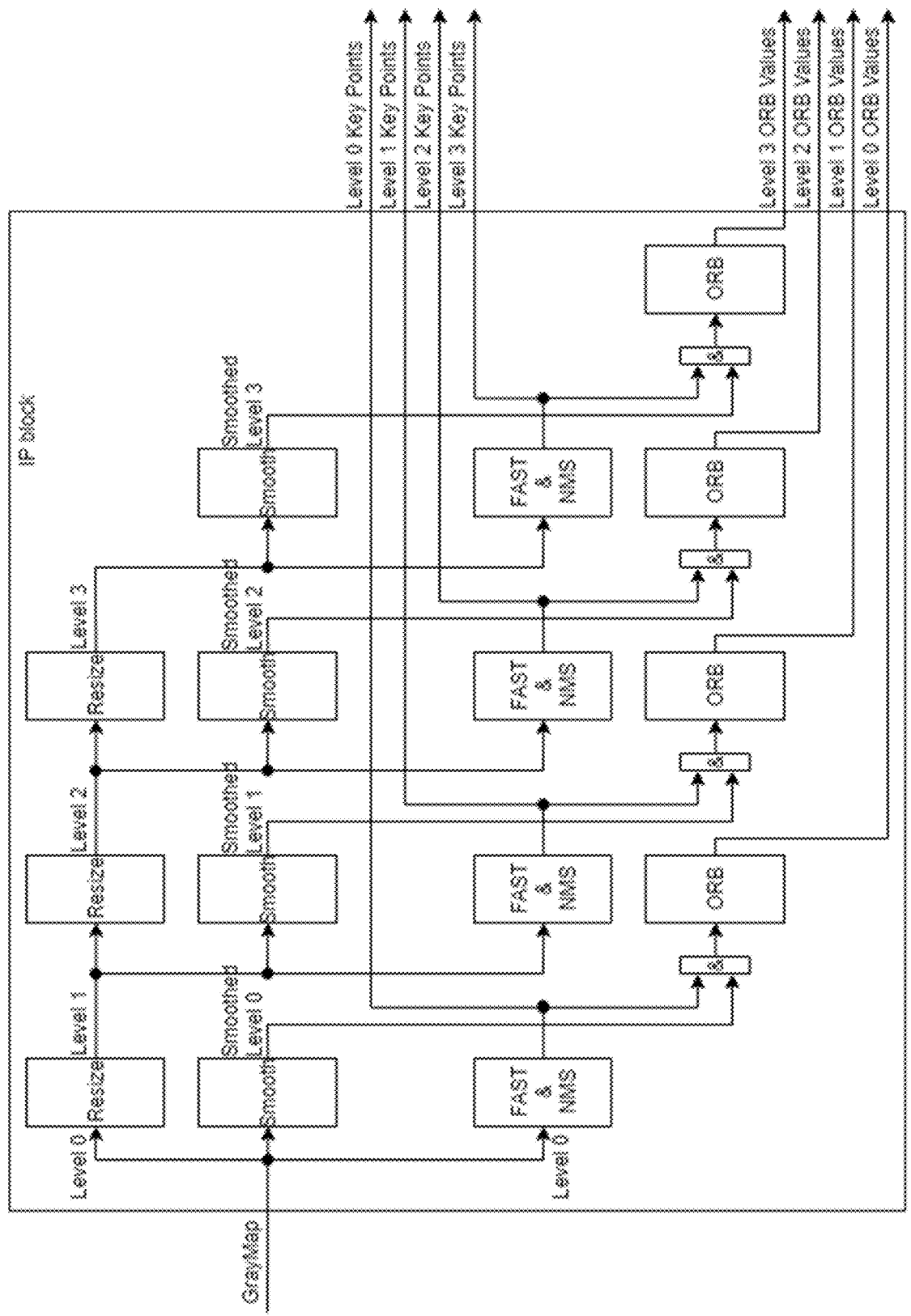
FIG. 9 is a multiple-instance IP block

FIGS. 8 and 9 are detailed block diagrams of the SLAM IP block. FIG. 8 depicts a single-instance IP block (meaning that there is one instance of each function in the IP block), while FIG. 9 depicts a multiple-instance IP block. In both FIG. 8 and FIG. 9, the Resize block and the Smooth block correspond to the two parts of the Build Pyramid function, Resize and Smooth, respectively—as described above. The FAST&NMS block corresponds to the FAST corner detection and Non-maxima suppression (NMS) in the Key Point Detection function as described above. The ORB block corresponds to the portion of the Feature Calculation function covered in the IP block, as described above.

The IP block in FIG. 8 shows an example with four levels and a single instance of each functional block. As such, the IP block requires the use of multiplexers (MUX) to choose different input level to each function. The IP block in FIG. 9 instead comprises multiple instances of each functional block—which contributes to better pipelining and parallel processing of the data. In both cases, each block is configurable. For example, if more levels are needed, more blocks can be added to the IP block.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more specialized processors executing a computer program to perform functions by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein.

What is claimed is:

1. A system for 3D vision processing, the system comprising:
    a sensor device;
    a processor;
    a memory module;
    a network interface; and
    a vision processing module comprising an integrated circuit that performs one or more 3D vision processing algorithms, including simultaneous localization and mapping (SLAM) algorithms comprised of a Build Pyramid function, a Key Point Detection function, and a Feature Calculation function, and a plurality of controllers that couple the integrated circuit to each of: the sensor device, the processor, the memory module, and the network interface;
    wherein:
        the vision processing module receives image data from the sensor device, the image data corresponding to one or more images captured by the sensor device;
        the vision processing module executes one or more of the 3D vision processing algorithms using at least a portion of the image data as input, including executing the Build Pyramid function to:
            receive color and depth data and a timestamp associated with the color and depth data from the sensor device;
            generate a gray map comprising a plurality of levels, using the color and depth data and the timestamp;
            resize the gray map;
            smooth a first level of the plurality of levels of the resized gray map; and
            determine whether to smooth all of the plurality of resized levels or to resize the smoothed first level; and
        the vision processing module transmits an output from execution of one or more of the 3D vision processing algorithms to at least one of: the processor, the memory module, or the network interface.

2. The system of claim 1, wherein the vision processing module comprises a field-programmable gate array (FPGA) or an application-specific integrated circuit (ASIC).

3. The system of claim 1, wherein when executing the Key Point Detection function, the vision processing module:
    executes a features from accelerated segment test (FAST) corner detection algorithm with non-maxima suppression on the resized gray map to detect one or more key points in the resized gray map; and
    determines whether one or more key points have been detected in each of the plurality of levels in the resized gray map.

4. The system of claim 3, wherein when executing the Feature Calculation function, the vision processing module:
    performs moment calculation on each detected key point to generate M01 and M10 values for the key point;
    calculate a magnitude value for each key point using the corresponding M01 and M10 values;
    rotate trained pattern coordinates for each key point based upon the M01 and M10 values and the magnitude for the corresponding key point; and
    calculates final ORB values using the rotated trained pattern coordinates.

5. The system of claim 4, wherein the vision processing module transmits the final ORB value, the M01 value, the M10 value, and the magnitude value of each key point to the processor, and the processor generates an intensity angle for the corresponding key point based upon the magnitude value, the M01 value and the M10 value of the key point.

6. The system of claim 5, wherein the vision processing module comprises one instance of each of the Build Pyramid function, the Key Point Detection function, and the Feature Calculation function.

7. The system of claim 5, wherein the vision processing module comprises a plurality of instances of each of the Build Pyramid function, the Key Point Detection function, and the Feature Calculation function.

8. The system of claim 1, wherein the processor, the memory module, the sensor device and the vision processing module are embedded in a System-on-Chip (SoC).

9. The system of claim 8, wherein the SoC is embedded in a mobile computing device.

10. The system of claim 8, wherein the processor, the memory module, the sensor device and the vision processing module are coupled to each other via a system bus.

11. The system of claim 1, wherein the network interface couples the vision processing module to a remote computing device.

12. The system of claim 1, wherein at least a portion of one or more of the 3D vision processing algorithms is executed by the processor in coordination with the vision processing module.

13. The system of claim 1, wherein the sensor device is a camera.

* * * * *